United States Patent [19]

Smith et al.

[11] Patent Number: 5,263,152
[45] Date of Patent: Nov. 16, 1993

[54] PROCESS FOR REPLACING NON-VOLATILE MEMORY IN ELECTRONIC PRINTING SYSTEMS

[75] Inventors: Mark A. Smith, Rochester; Kitty Sathi, Pittsford; Jack T. Latone, Rochester, all of N.Y.

[73] Assignee: Xerox Corporation, Stamford, Conn.

[21] Appl. No.: 678,922

[22] Filed: Apr. 1, 1991

[51] Int. Cl.⁵ .............................................. G06F 11/00
[52] U.S. Cl. ............................. 395/575; 364/DIG. 2; 364/943.9; 364/944; 364/944.2; 364/944.5; 364/944.9; 371/8.1; 371/21.2
[58] Field of Search ................... 395/575; 364/DIG. 2; 371/8.1, 21.2

[56] References Cited

U.S. PATENT DOCUMENTS 4,499,581 2/1985 Miazga et al. ................... 371/20

Primary Examiner—Gareth D. Shaw
Assistant Examiner—A. Katbab
Attorney, Agent, or Firm—Frederick E. McMullen; Gary B. Cohen

[57] ABSTRACT

A method is provided for preserving the integrity of a memory in an electronic printer in the event that a printed wiring board with non-volatile memory is replaced. The memory includes plural disks providing permanent data storage and the non-volatile memory communicating with the disks. In the method, a processor identifier is provided with the printed wiring board. A time stamp indicating the date of installation of the printed wiring board is generated, and the processor identifier of the printed wiring board is combined with the time stamp to provide an identifier seal. Copies of the identifier seal are stored to each of the disks. The processor identifier of the printed wiring board is compared with the processor identifiers of the respective identifier seals of the disks in response to booting the processor. When the processor identifier on the printed wiring board is substantially different from one of the processor identifiers of the disks, the printed wiring board is replaced and the transfer of data between the non-volatile memory and the disks is inhibited until the processor identifier of the replaced wiring board and the processor identifiers of the disks correspond substantially.

10 Claims, 18 Drawing Sheets

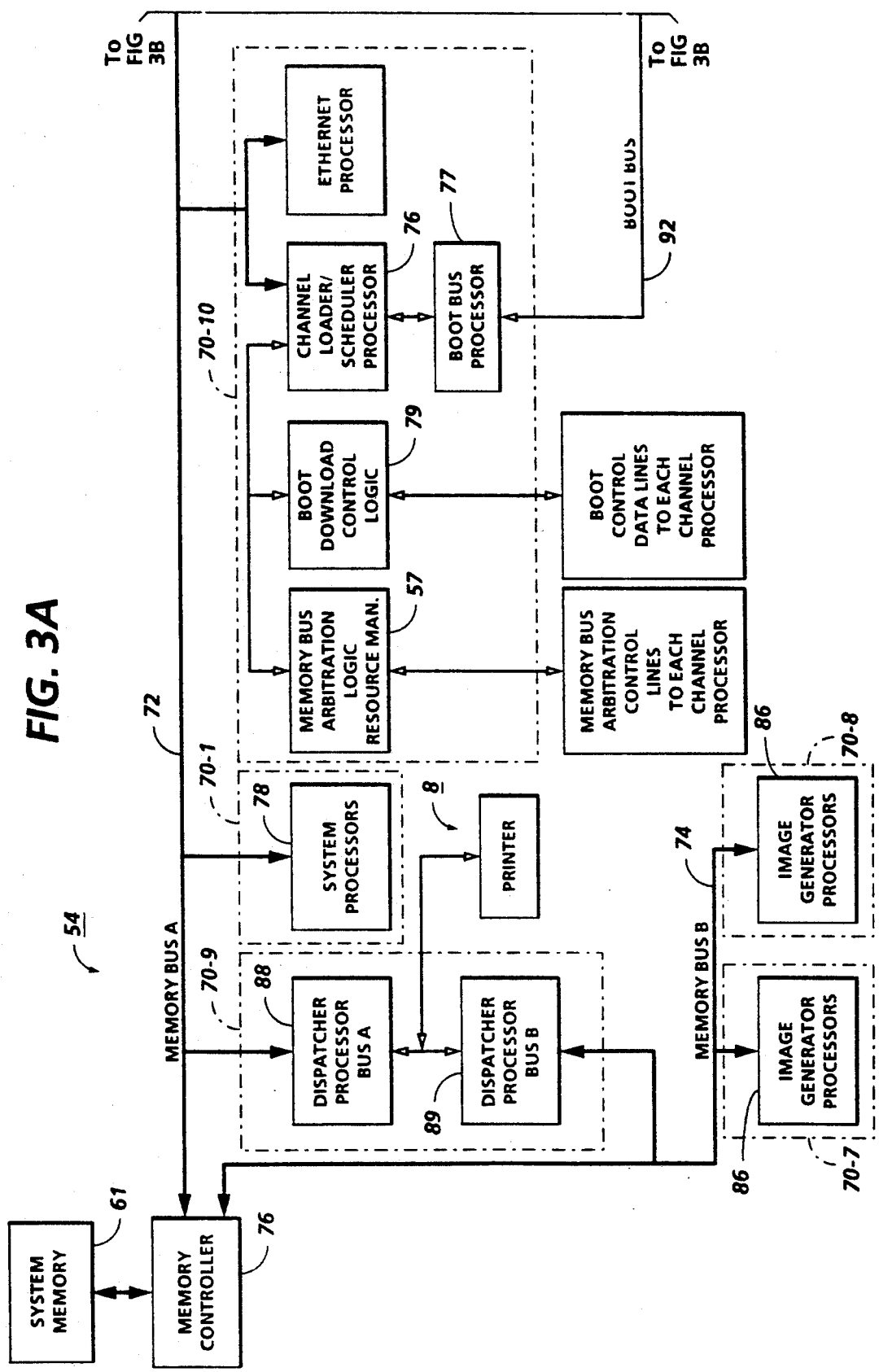

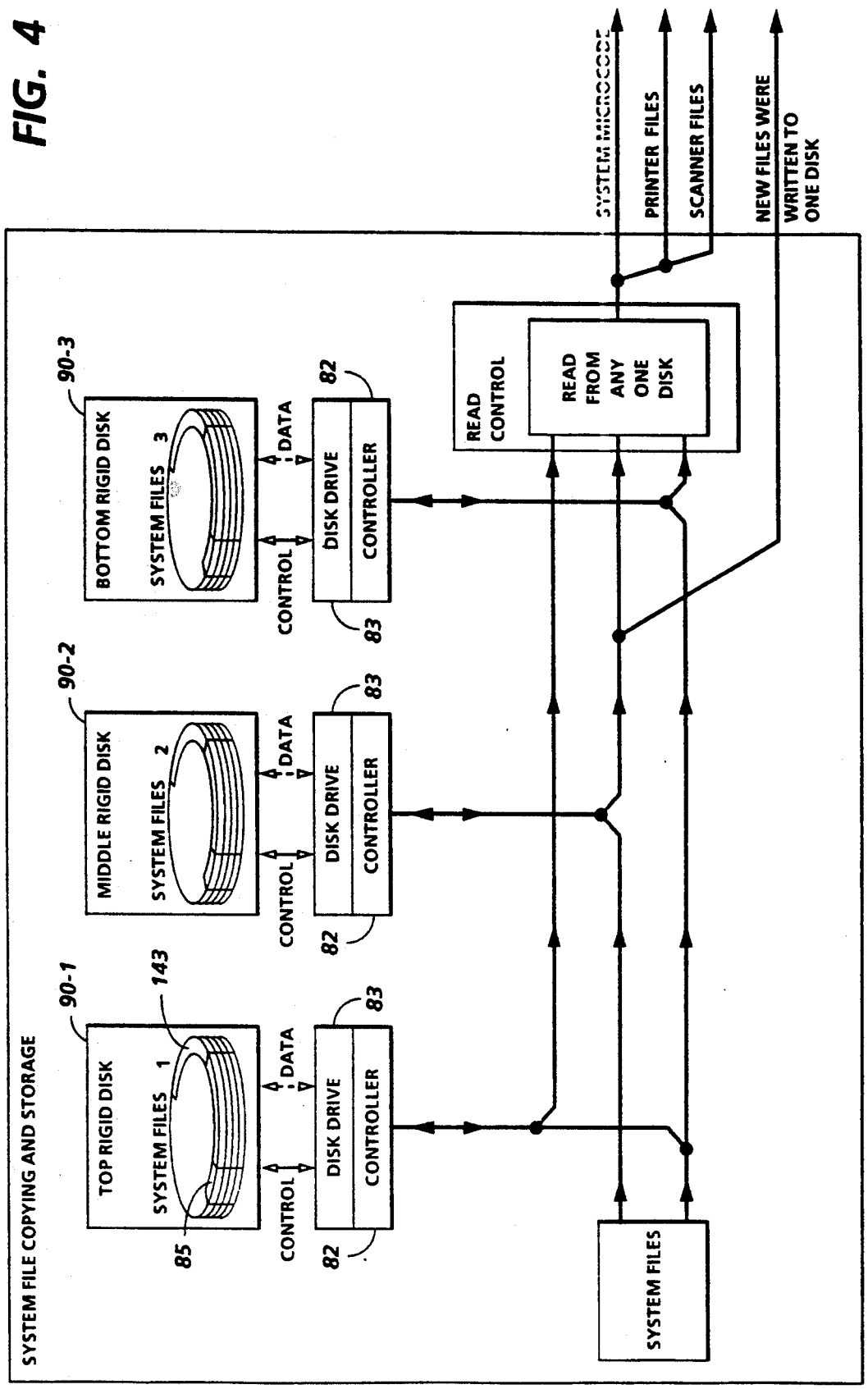

PROCESS FOR REPLACING NON-VOLATILE MEMORY IN ELECTRONIC PRINTING SYSTEMS

CROSS-REFERENCE TO RELATED APPLICATIONS

The present application is related to the following co-pending applications, which are assigned to the same assignee as is the present application and incorporated by reference herein: U.S. patent application Ser. No. 07/678,924, filed Apr. 1, 1991 to Kitty Sathi et al to "Process For Upgrading Software In An Electronic Printing System"; U.S. patent application Ser. No. 07/678,925, filed Apr. 1, 1991 to Christopher Comparetta et al to "A Process For Replacing Storage Media in Electronic Printing Systems"; U.S. patent application Ser. No. 07/678,926, filed Apr. 1, 1991 to Kitty Sathi et al to "File Storage Process For Electronic Printing Systems Having Multiple Disks"; U.S. patent application Ser. No. 07/678,508, filed Apr. 1, 1991 to Robert J. Slomcenski et al to "File Updating Process For Electronic Printing Systems"; and U.S. patent application Ser. No. 07/678,091, filed Apr. 1, 1991 to Ronald A. Ippolito et al to "Process For Accommodating Bad Disk Pages In An Electronic Printing System".

The invention relates to electronic printers and printing systems, and more particularly, to a process for replacing the printed wiring board bearing system non-volatile memory for such systems.

An important task of the operating system in an electronic printing system is the maintenance of files which are permanent objects recorded on backing storage such as hard disks and Non-Volatile Memory (NVM) memory. Files, which consist of a sequence of pages, comprise system files and image files. The file system provides the operating system with facilities for creating, organizing, reading, writing, modifying, copying, moving, deleting, and controlling access to the files.

The system NVM memory is used for temporary storage of critical updates to disk directories and files. Because of the NVM memory's critical importance to the system, replacement of the NVM memory, either due to some failure of the Printed Wiring Board (PWB) on which the NVM memory is mounted or to failure of the NVM memory itself may adversely affect future system operation and result in the loss of critical files.

In the prior art, U.S. Pat. No. 4,819,237 to Hamilton et al discloses a system for monitoring the validity of volatile memory based on comparison of compressed bit patterns. U.S. Pat. No. 4,751,667 to Ross discloses a system for verifying the identity of a dynamic memory using defective or corrupted cell patterns. U.S. Pat. No. 4,727,544 to Brunner et al discloses a system for checking memory integrity using checksum comparisons. U.S. Pat. No. 4,920,518 to Nakamura et al discloses a circuit having nonvolatile memory in which protection data is stored to control programming operations. U.S. Pat. No. 4,907,231 to Watanabe et al discloses a memory cartridge for connection to an electronic device such as a video camera while U.S. Pat. No. 4,930,129 to Takahira discloses an IC card with internal error checking capability designed to protect areas of the memory.

In contrast, the present invention provides, in an electronic printing system having system memory with plural hard disks providing permanent memory and non-volatile memory, and a printed wiring board having a memory chip thereon, the printed wiring board supporting at least a portion of the non-volatile memory, a process for preserving the integrity of the permanent memory and the non-volatile memory in the event the non-volatile memory is replaced, comprising the steps of: programming the memory chip with a permanent processor identifier for the system; generating a time stamp identifying the date the printed wiring board was installed in the system; combining the processor identifier from the chip with the time stamp to provide an identifier seal to identify the printed wiring board installation date and the processor with which the non-volatile memory was installed; storing copies of the identifier seal to each of the hard disks; and comparing the processor identifier from the chip with the processor identifier in the identifier seal whenever the system is booted to an operating state to determine if the printed wiring board with the non-volatile memory has been replaced.

IN THE DRAWINGS

Figure 1:
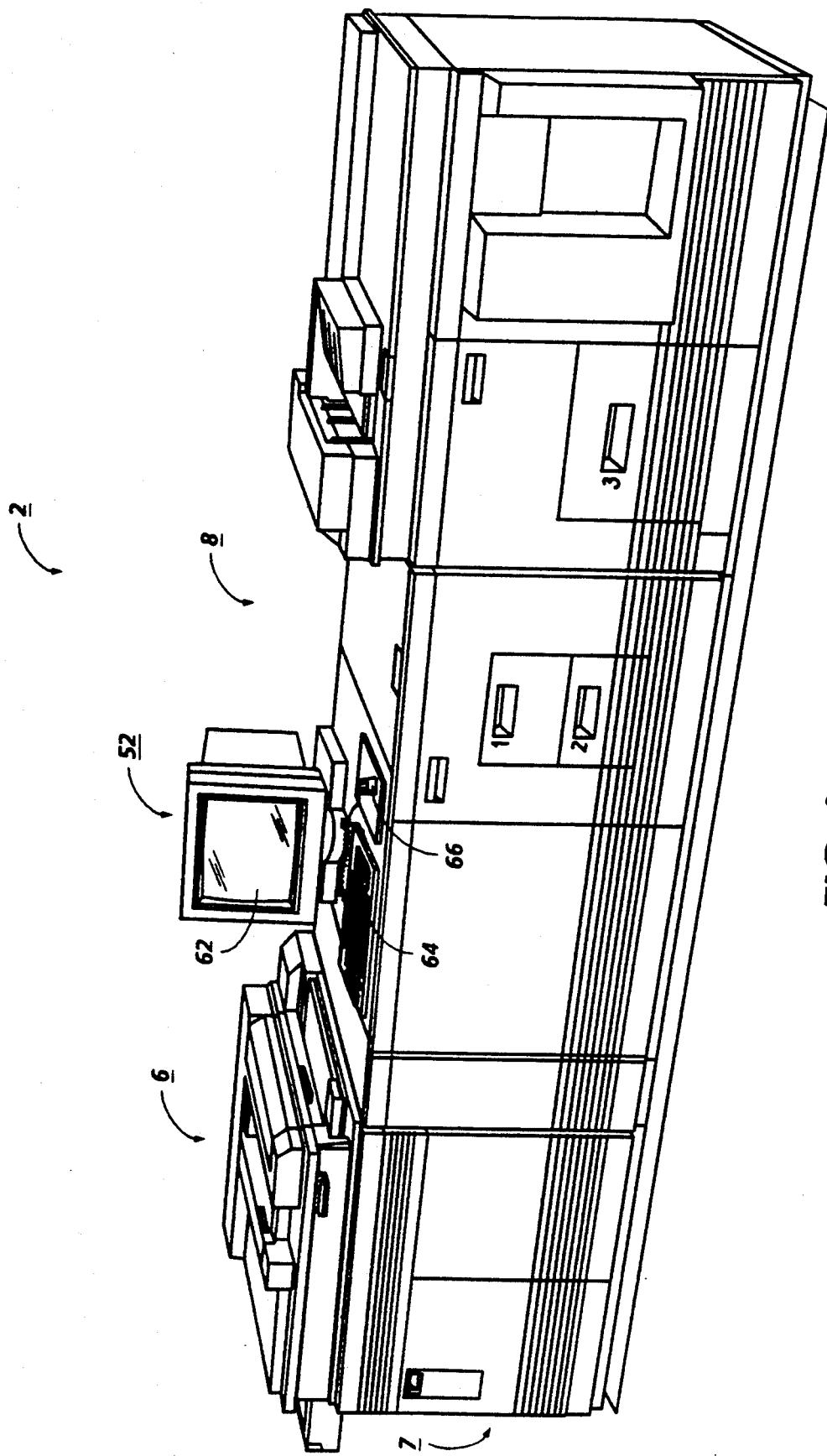
FIG. 1 is a view depicting an electronic printing system incorporating the PWB replacing process of the present invention.
Figure 3B:
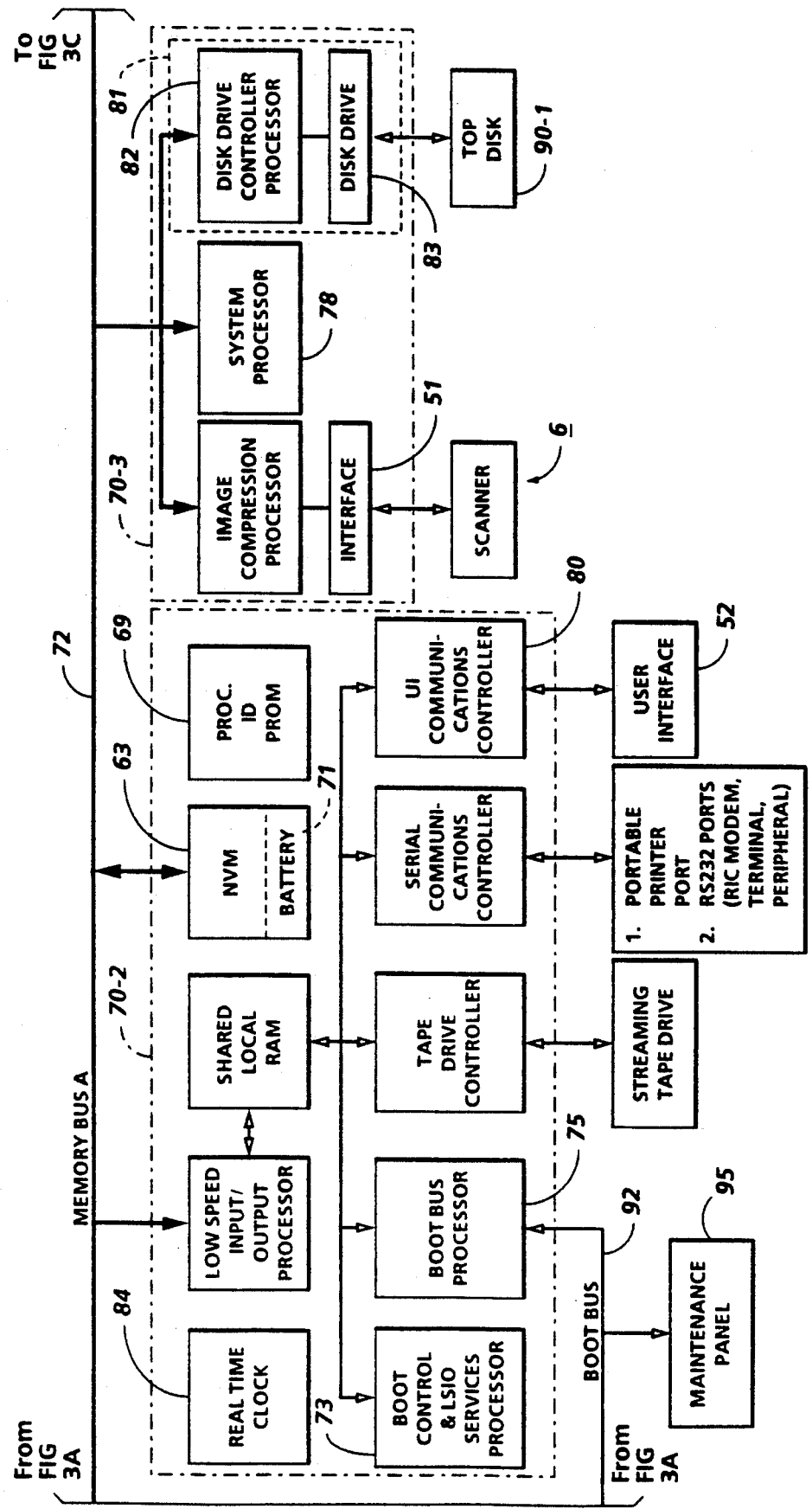
Figure 3C:
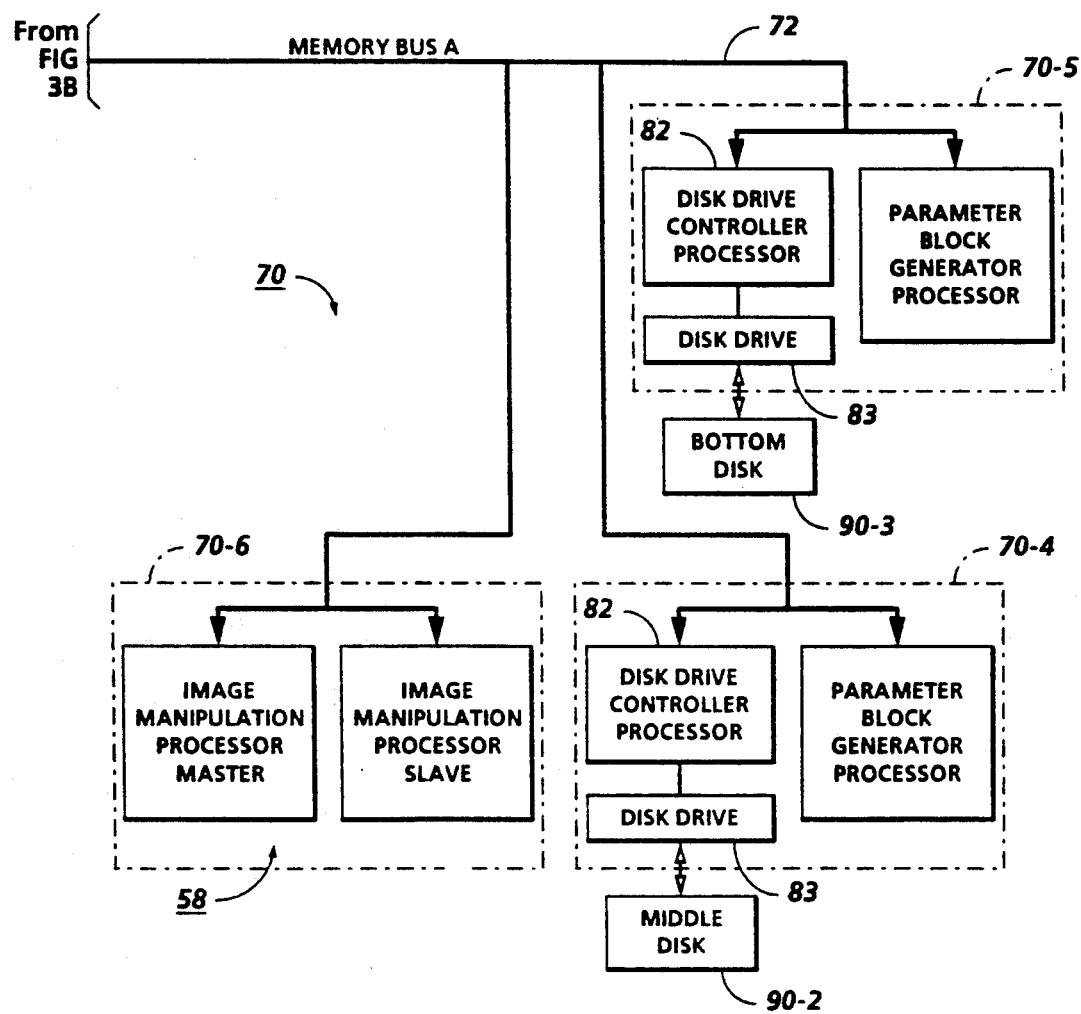
Figure 5:
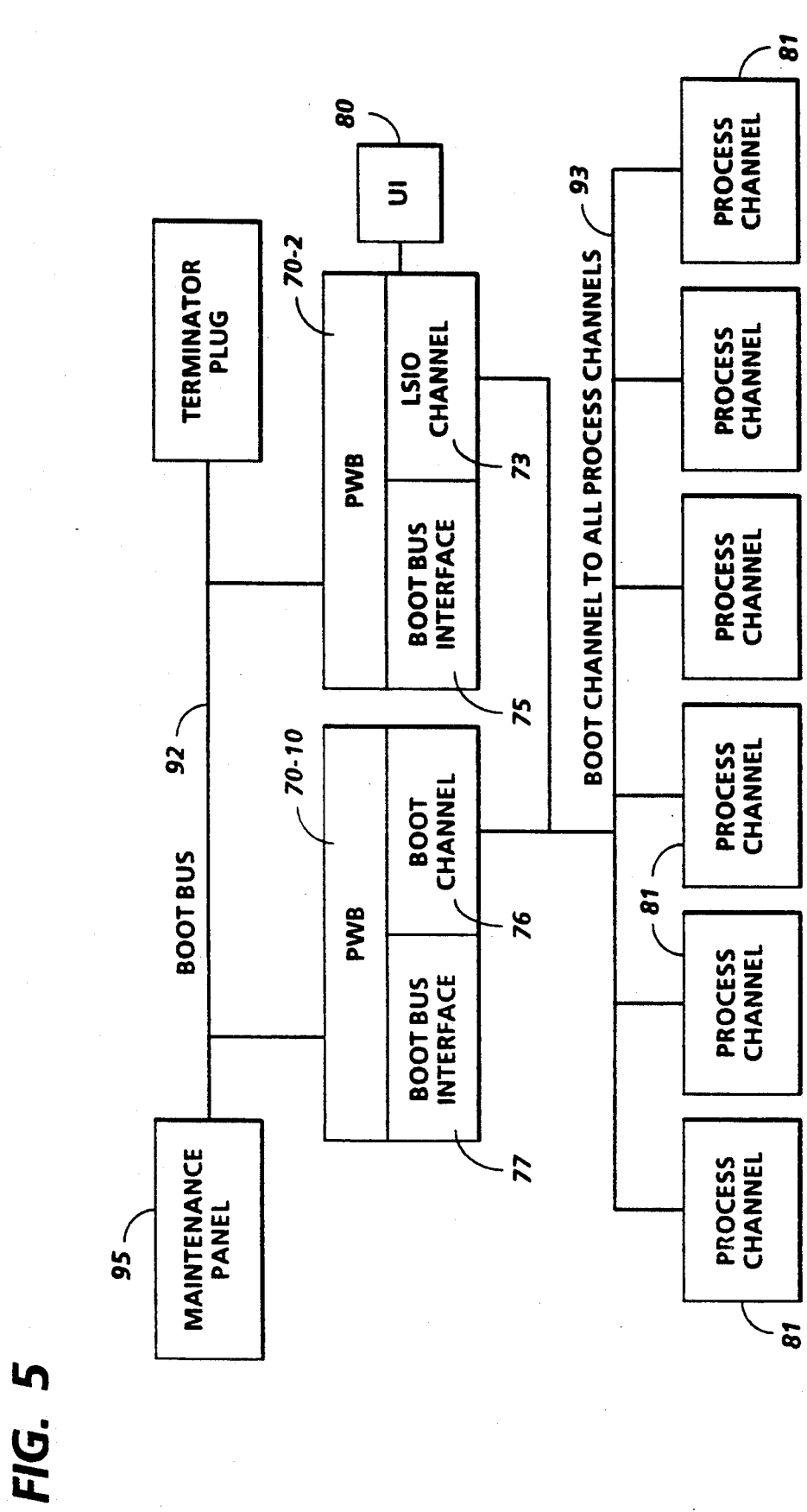
Figure 6:
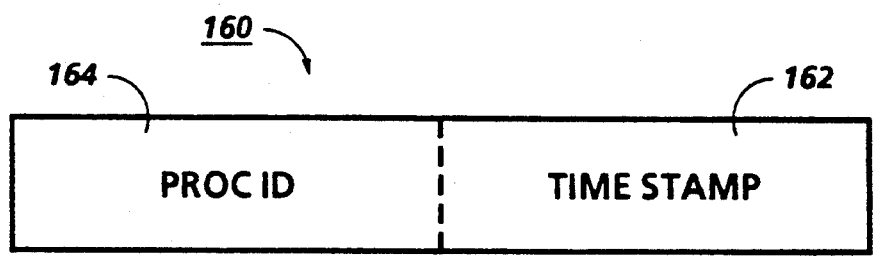
Figure 7:
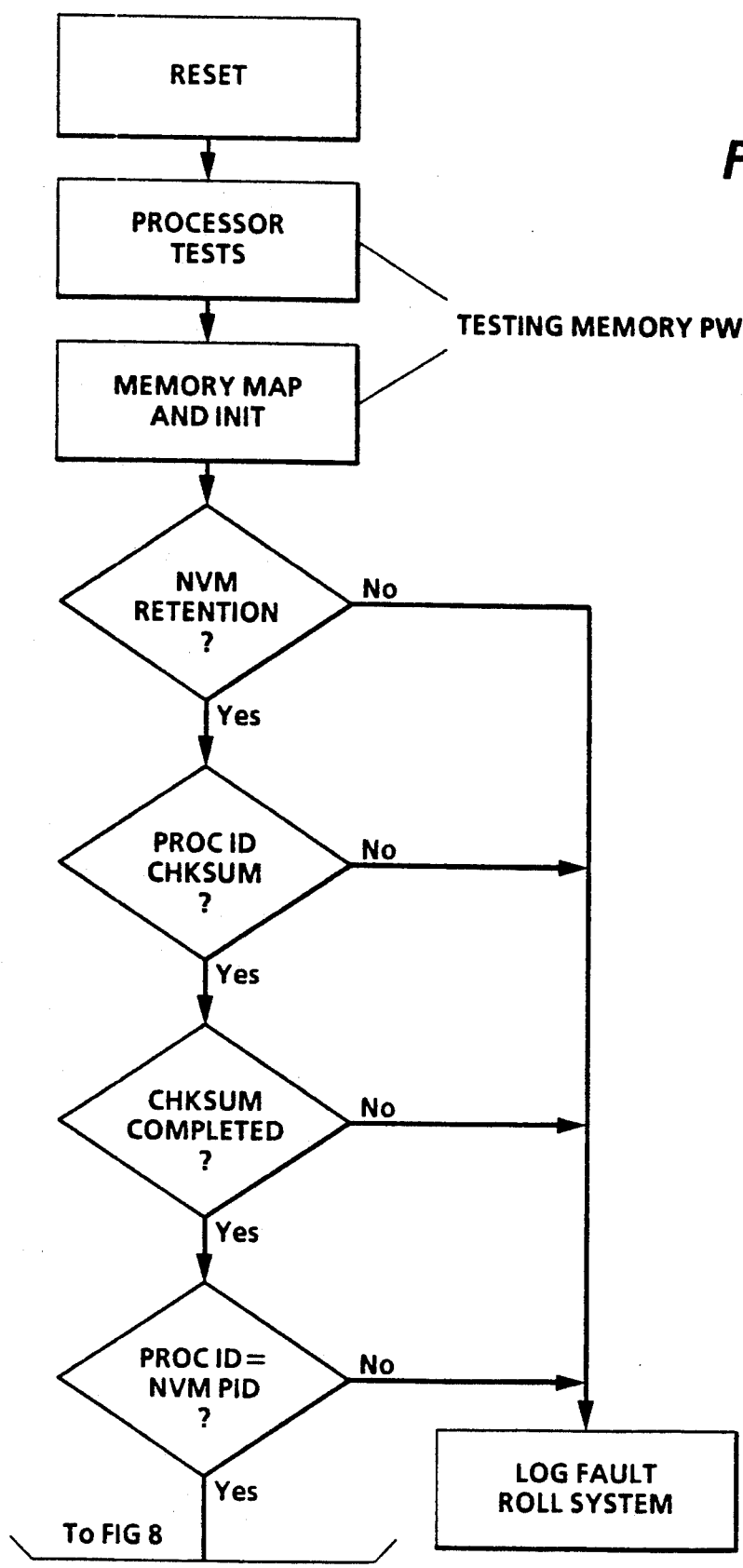
Figure 8A:
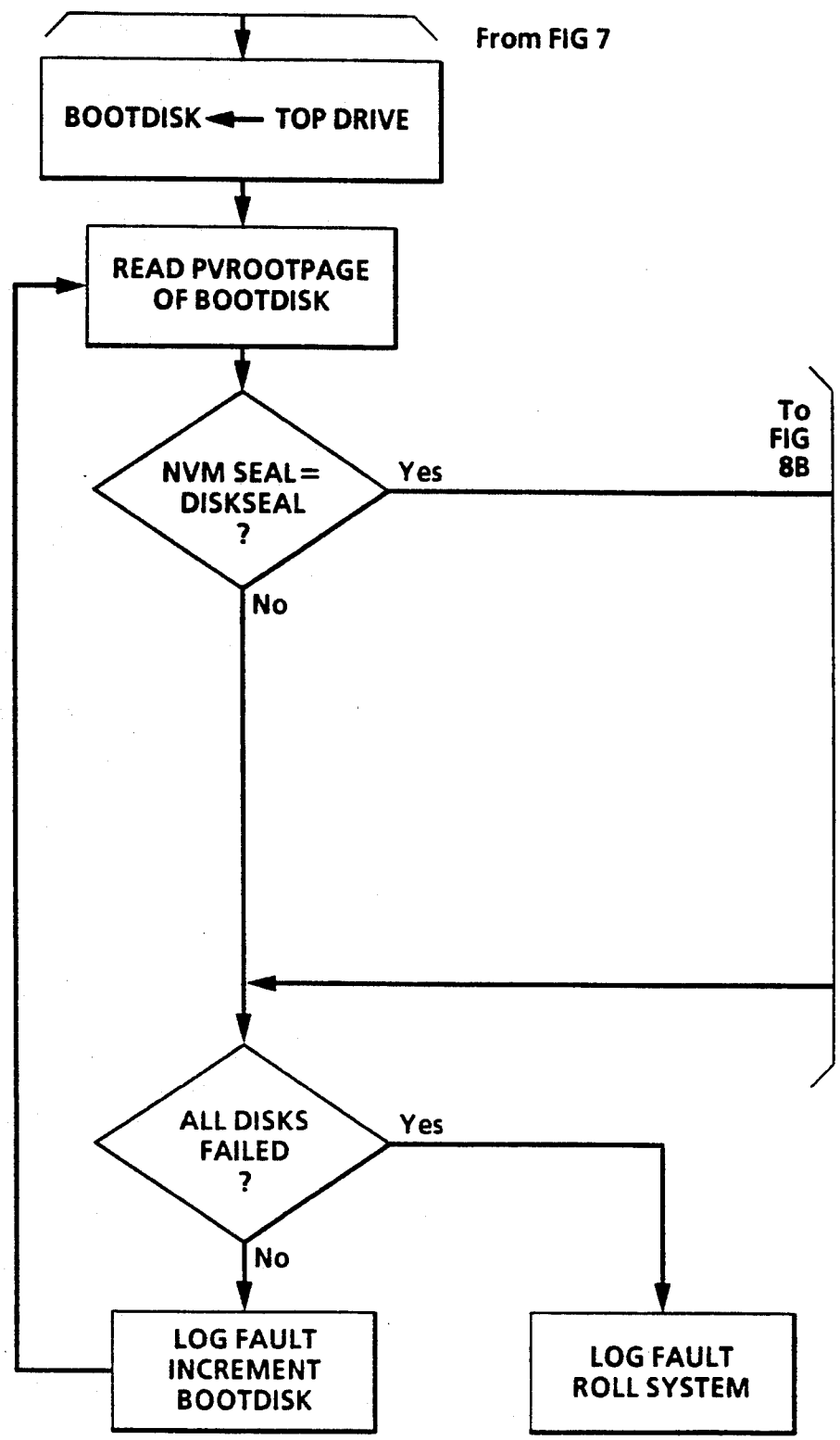
Figure 8B:
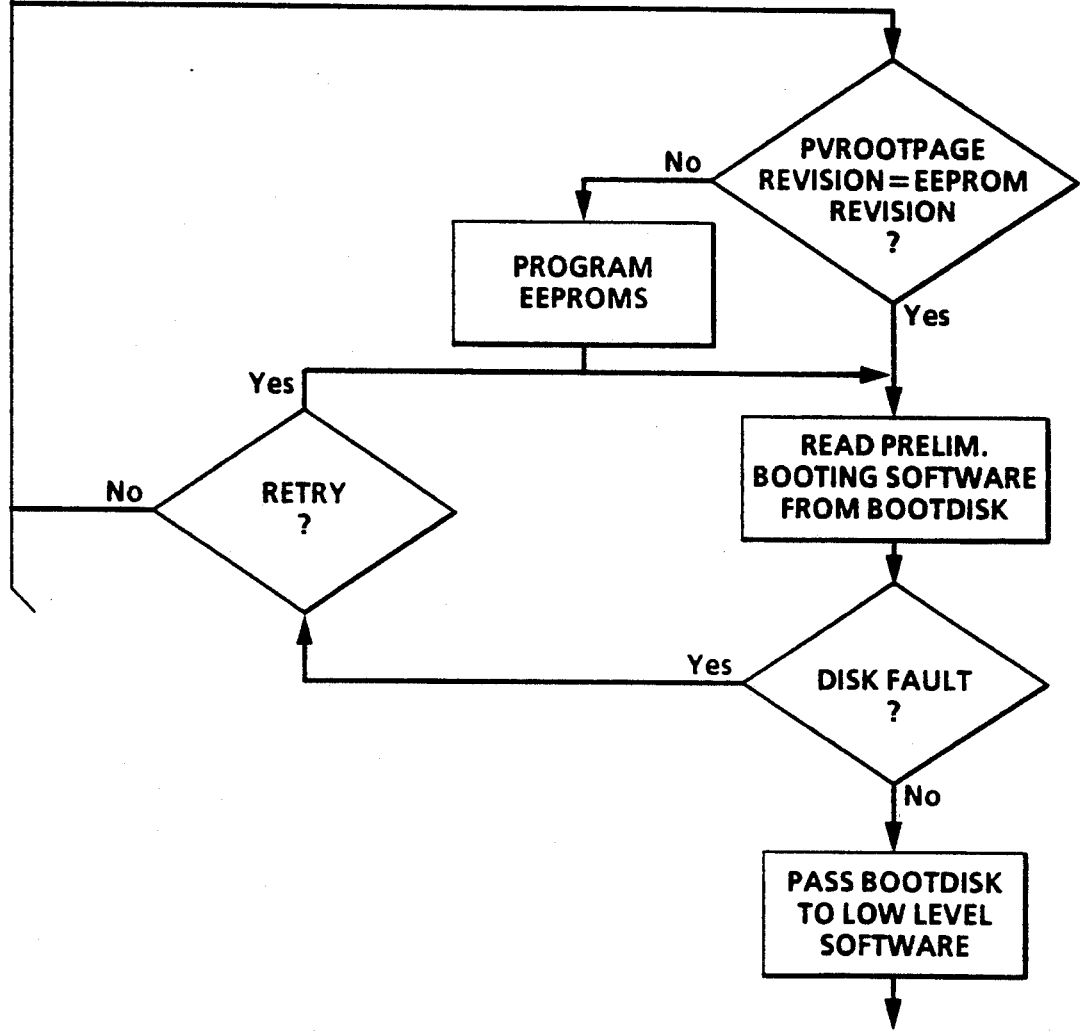
Figure 9:
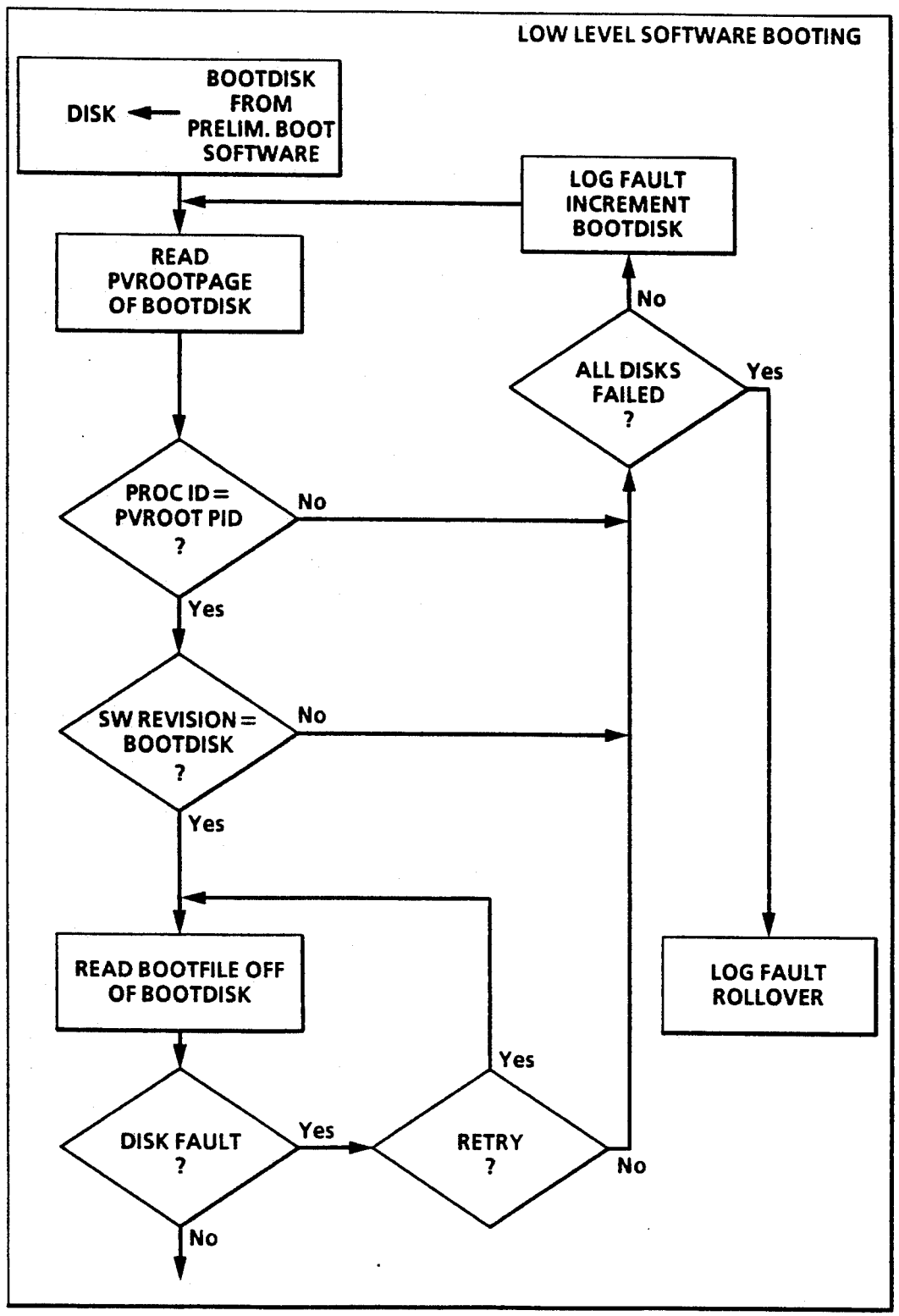
Figure 10:
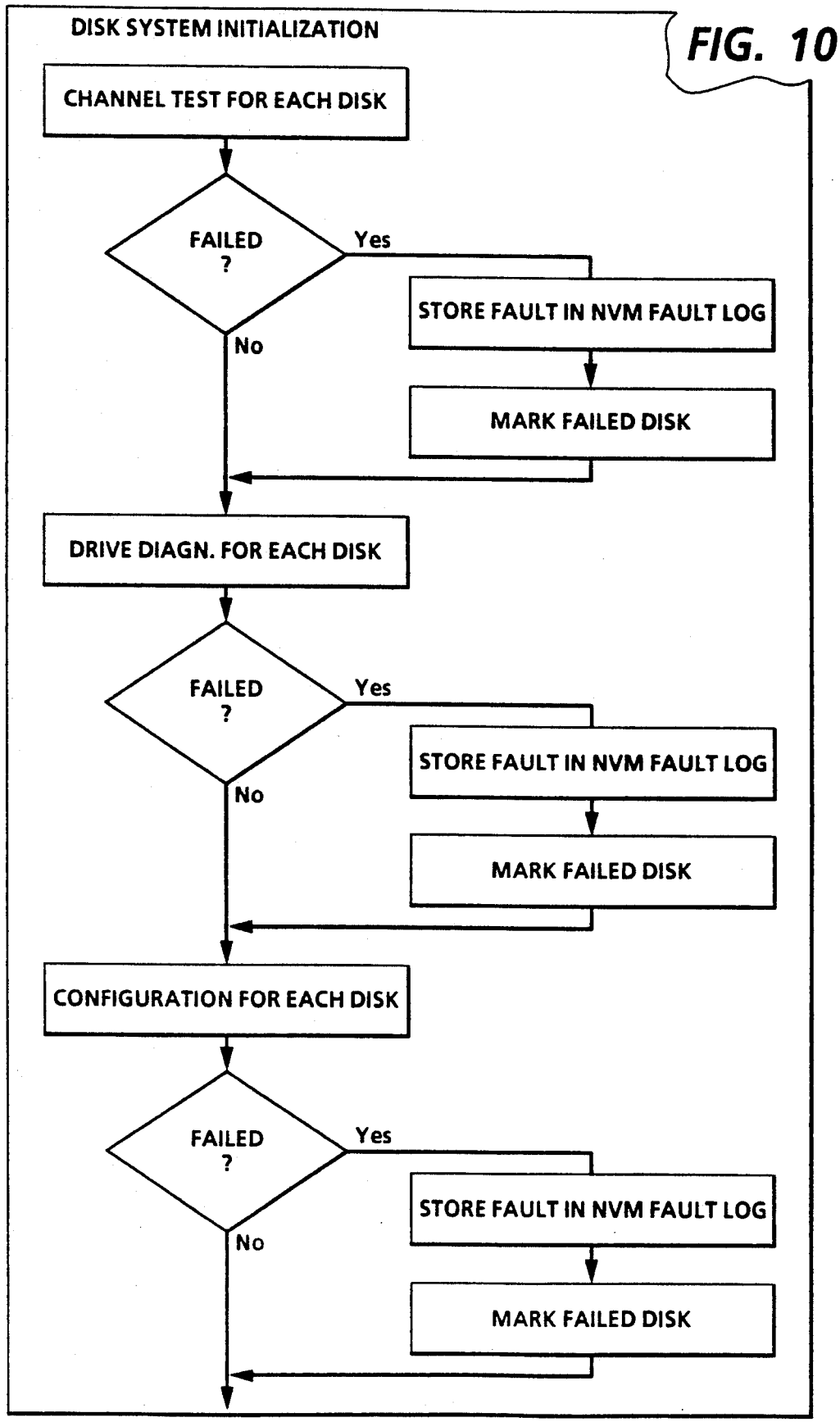
Figure 11:
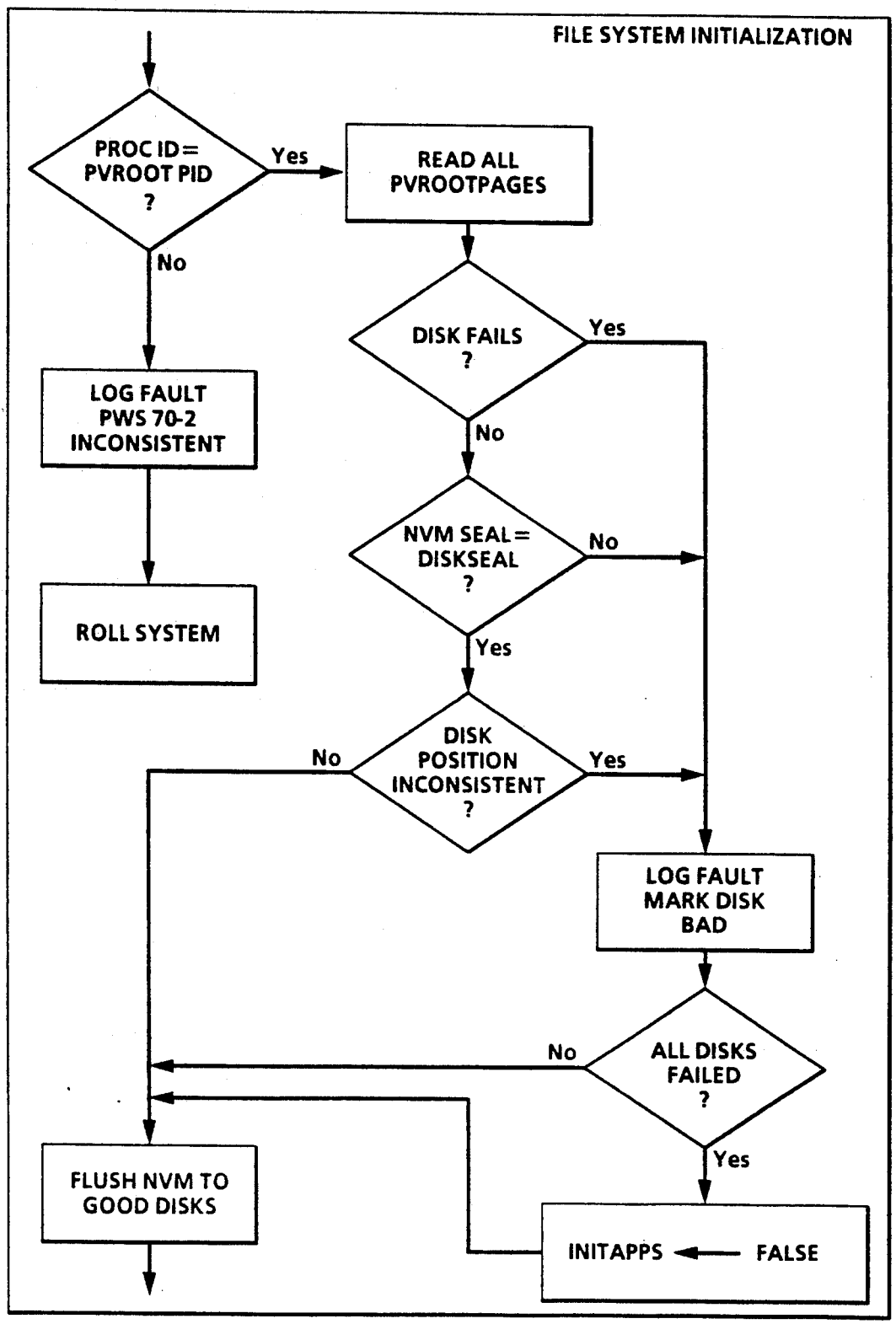
Figure 12:
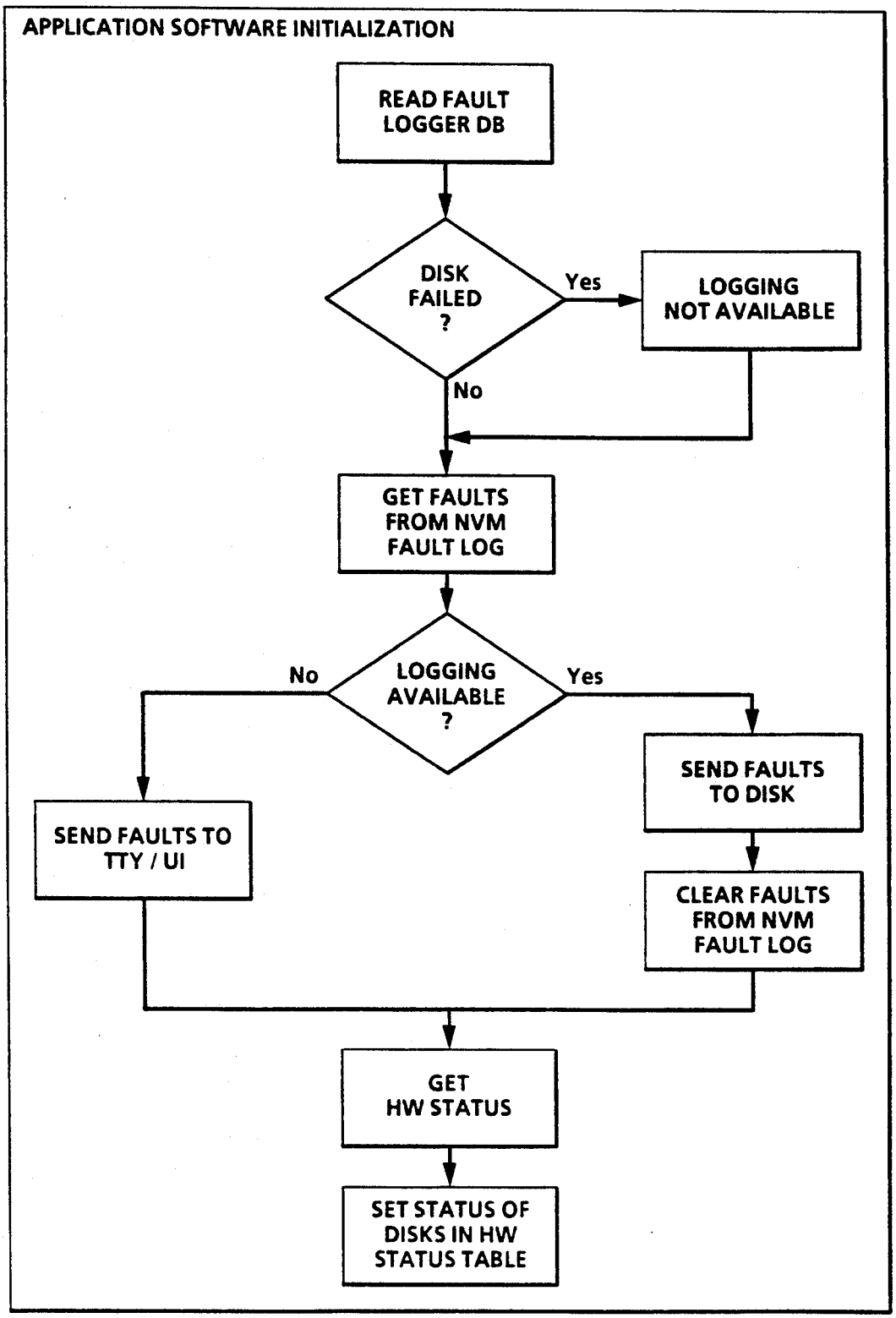
Figure 13:
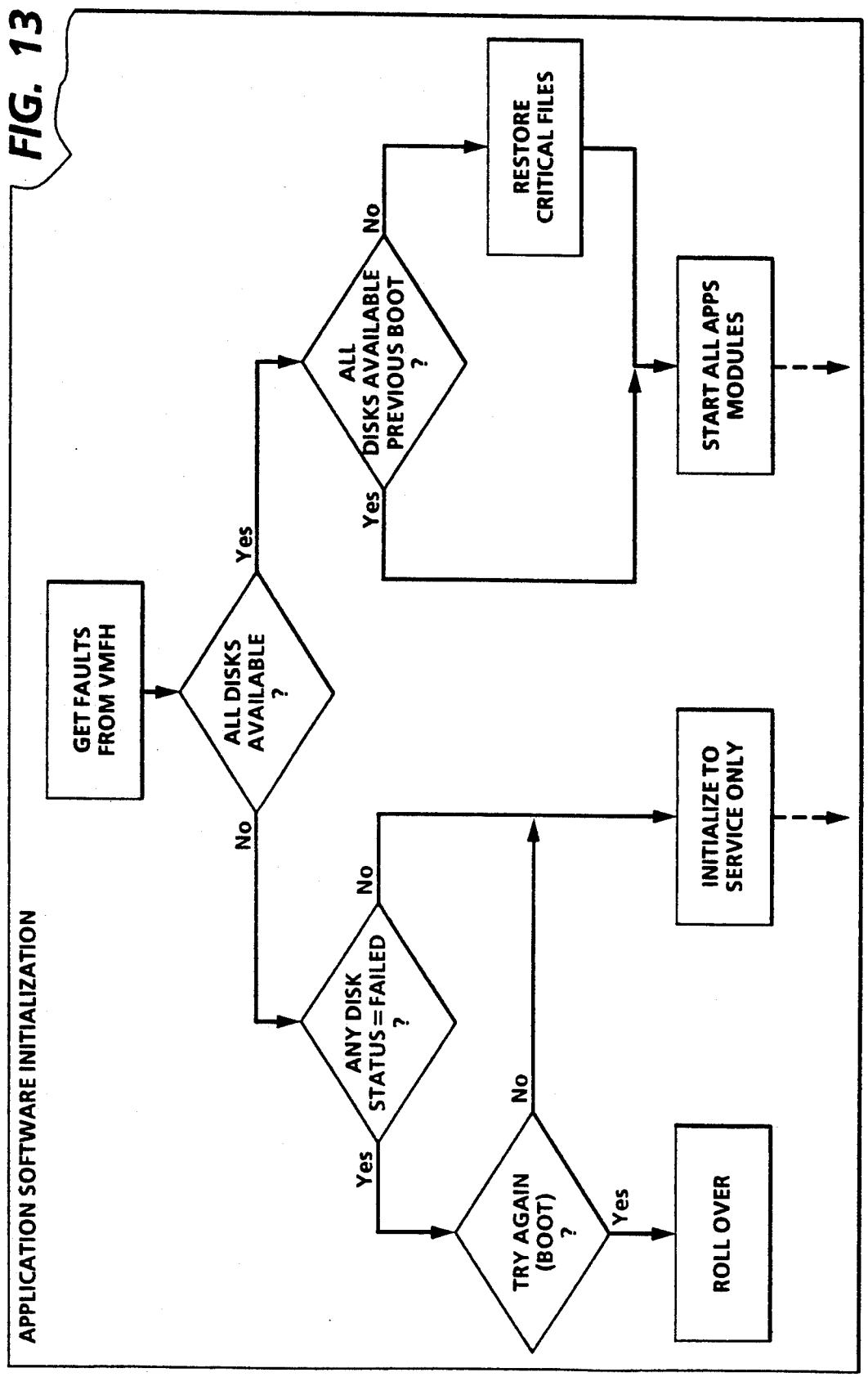
Figure 14:
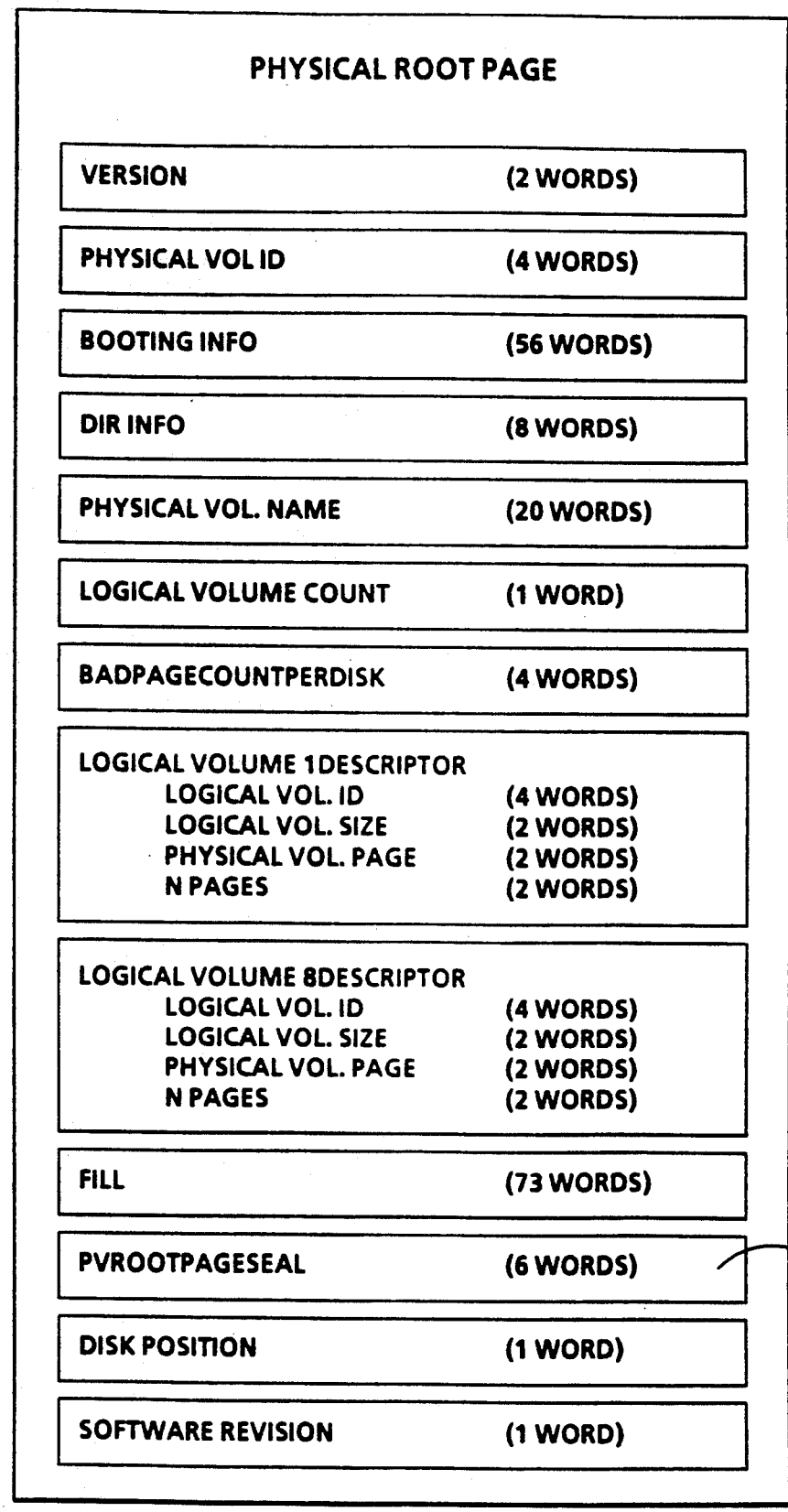

FIGS. 3A, 3B, and 3C comprise a schematic block diagram showing the major parts of the control section for the printing system shown in FIG. 1;

FIG. 4 is an isometric view of the system disk storage depicting examples of a boot file, bad page table, and PV ROOT PAGE;

FIG. 5 is a block diagram showing the boot system for booting the printing system depicted in FIG. 1 to an operating state;

FIG. 6 is is a view showing the PROC ID and TIME stamp elements that comprise the system processor identification seal for the printing system shown in FIG. 1;

FIG. 7 is a flow chart illustrating verification of NVM and PWB seals during booting;

FIG. 8 consisting of 8A and 8B are flow charts illustrating the process for identifying boot disk and loading preliminary booting software during booting;

FIG. 9 is a flow chart illustrating the low level software booting process;

FIG. 10 is a flow chart illustrating disk system initialization during booting;

FIG. 11 is a flow chart illustrating file system initialization during booting;

FIGS. 12 and 13 are flow charts illustrating application software initialization during booting;

FIG. 14 is a view depicting the "Physical Root Page" stored in disk memory.

Figure 15:
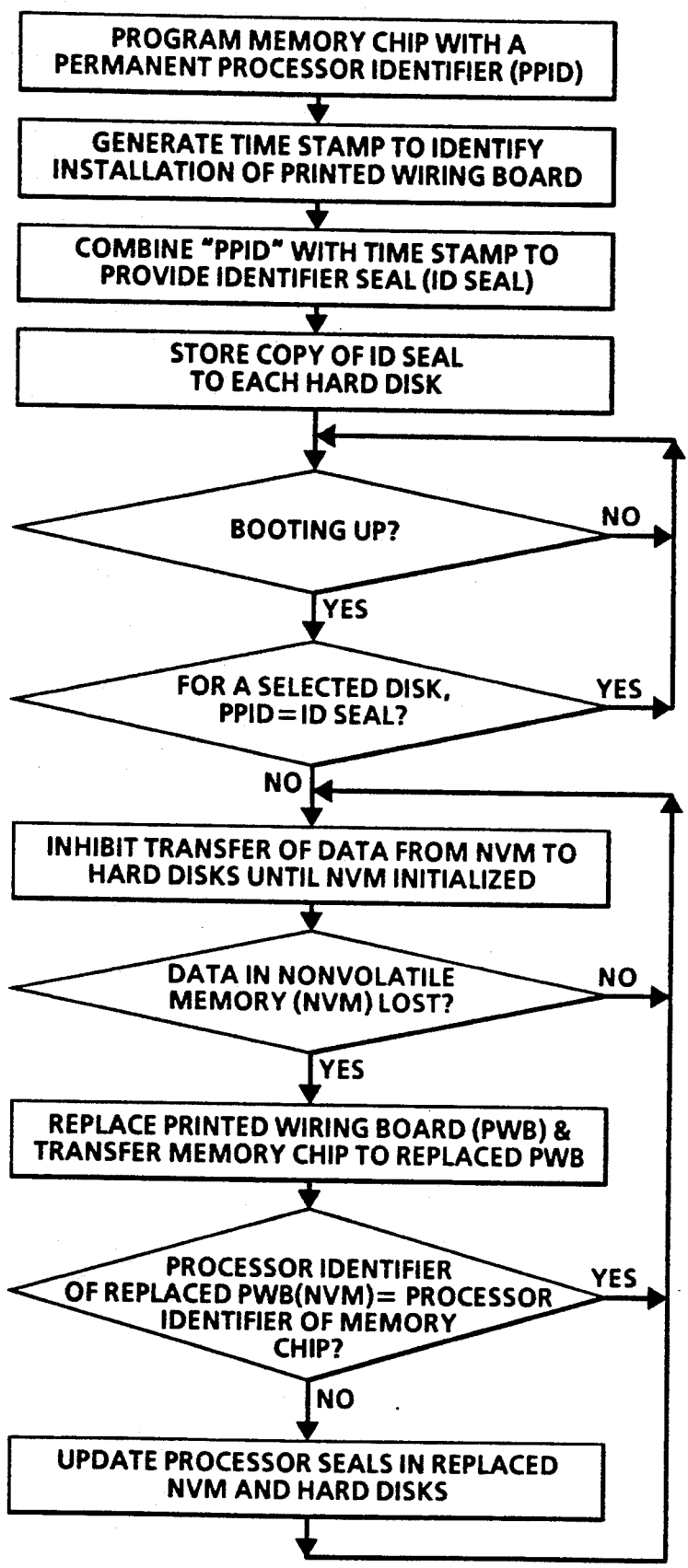

FIG. 15 is a flow diagram illustrating selected steps of a claimed embodiment of the present invention.

Figure 2:
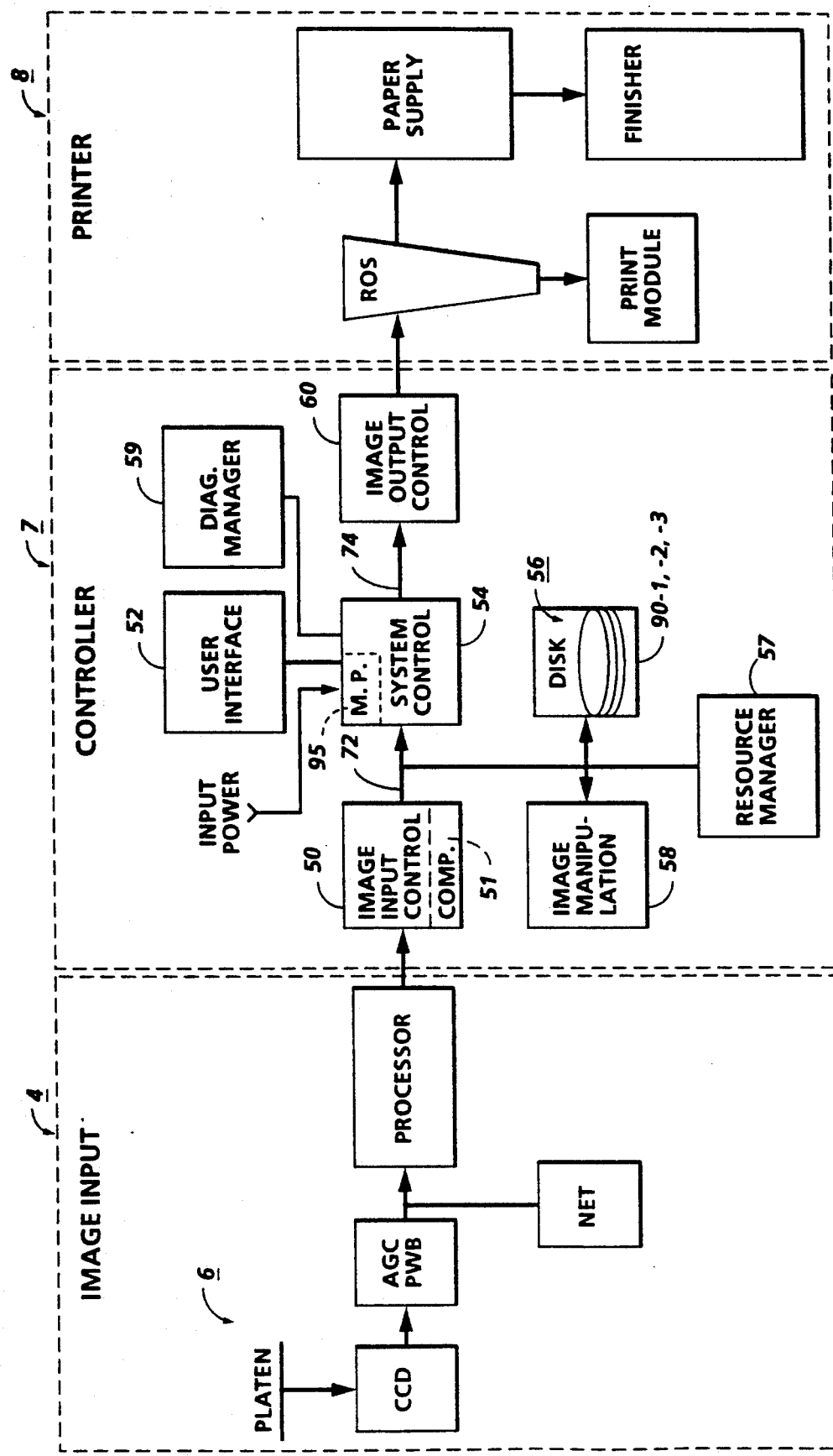
FIG. 2 is a block diagram depicting the major control system elements of the printing system shown in FIG. 1.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc. or else other image scanning/processing/recording systems, or else other signal transmitting/receiving, recording systems, etc. as well.

A more detailed description of printing system 2 may be found in copending U.S. patent application Ser. No. 07/620,519, filed Nov. 30, 1990, to James R. Graves et al, and entitled "System For Scanning Signature Pages", the disclosure of which is incorporated by reference herein.

Referring to FIG. 2, controller section 7 is, for explanation purposes, divided into an image input controller 50, User Interface (UI) 52, system controller 54, disk memory 56, image manipulation section 58, Resource Manager 57, Diagnostic Manager 59, and image output controller 60.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point a cursor to the item selected and keying the mouse.

Referring to FIGS. 2 and 3A-3C, the scanned image data input from scanner section 6 to controller section 7 is compressed by image compressor/processor 51 of image input controller 50 on PWB 70-3. The compressed image data with related image descriptors are placed in image files and temporarily stored in system memory 61 pending transfer to external memory 56 where the data is held pending use.

When the compressed image data in memory 56 requires further processing or is required for display on touchscreen 62 of UI 52, or is required by printer section 8, the data is accessed in memory 56 and transferred to system memory 61. Where further processing other than that provided by processor 25 is required, the data is transferred to image manipulation section 58 on PWB 70-6 where additional processing steps such as collation, make ready (document editing), decomposition, rotation, etc. are carried out. Following processing, the data may be returned to external memory 56, sent to UI 52 for display on touchscreen 62, or sent to image output controller 60.

Resource Manager 57 controls access to disks 90-1, 90-2, 90-3 and RAM 61 files while diagnostic manager 59 handles system faults.

Image data output to image output controller 60 is decompressed and readied for printing and output to printer section 8. Image data sent to printer section 8 for printing is normally purged from memory 56 to make room for new image data.

As shown in FIGS. 3A-3C, controller section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural application or system processors 78; low speed I/O processor PWB 70-2 having UI communication controller 80 for transmitting data to and from UI 52, Boot Control and LSIO Services Processor 73, and Boot Bus Processor 75; PWBs 70-3, 70-4, 70-5 having disk drive controller/processors 82 with disk drives 83 for transmitting data to and from disks 90-1, 90-2, 90-3 respectively of external memory 56 (image compressor/processor 51 for compressing the image data and another application processor 78 are on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10 having Channel Loader/Scheduler Processor 76, Boot Bus Processor 77, Boot Download Control Logic 79, and Memory Bus Arbitration Logic/Resource Manager 57. As will appear, Loader/Scheduler Processor 76 has two functions, one as a Boot channel to bring the system to the ready state and the other as a scheduler channel used to decide which channel performs which task and in which sequence the tasks will be performed.

Each independent processor and associated circuitry form a channel 81. Channels 81 (an example is shown in FIG. 3B) are independent processors for handling the applications software, or input/output processors for handling peripheral devices such as disk drives. For example, there are disk channels used to interface disk drives 83 for disks 90-1, 90-2, 90-3, scanner interface channel, printer interface channel, etc.

Memory 56 has plural hard disks 90-1, 90-2, 90-3 on which image files and system files are stored. Image files are typically files of scanned image data while system files comprise system operating files such as boot files, software files, data files, etc.

System memory 61, which comprises a Random Access Memory or RAM, serves as a temporary store for data required during system operations. Memory 61 stores bits of data which can be written to (Data Entered) or read from (Data Used) from the memory. Other data in memory 61 is used for reference and remains loaded as long as power is supplied. Since memory 61 is volatile, that is, all data is lost when power to memory 61 is terminated, Non Volatile Memory or NVM, which essentially comprise RAM memory with backup battery 71 to supply DC voltage when power is turned off, are provided at several locations in the system as, for example, NVM 63 on Low Speed I/O Processor PWB 70-2 (FIG. 3B). System memory includes a battery date code identifying the date on which battery 71 was made. NVM 63 is used to store file management updates and file content updates.

Image files are stored in Super Disk fashion as more fully described in copending U.S. patent application Ser. No. 07/590,634, filed Sep. 28, 1990 now abandoned and refiled under file wrapper continuation on Oct. 15, 1992 with Ser. No. 07/962,166, to George L. Eldridge, and entitled "Method of Operating Disk Drives in Parallel", the disclosure of which is incorporated by reference herein. For this, image files are divided into sectors, each sector being a preset number of bytes. The sectors are written in succession to successive disks until all of the sectors that comprise the image file are stored. Super Disk allows faster read/write access to image files since all disks 90-1, 90-2, 90-3 can be accessed simultaneously. The risk incurred in this type of arrangement, however, is the loss of parts of a file should one or more of the disks fail which effectively results in loss of the entire file.

System files are replicated on each of the disks 90-1, 90-2, 90-3 at the same address. Replicated files are written simultaneously to all three disks 90-1, 90-2, 90-3, with the disk heads in the same position. Copending U.S. patent application Ser. No. 07/678,922, filed Apr. 1, 1991, to Christopher Comparetta et al, entitled "A Process For Replacing Storage Media in Electronic Printing Systems", the disclosure of which is incorporated by reference herein, provides further explanation of system and image file handling.

Referring to FIGS. 3A, 3B, 4 and 5 and TABLE I, a boot file 143 is replicated on each of the disks 90-1, 90-2, 90-3 for booting system 2. In order to disk boot system 2, the boot software loads the necessary files from whichever disk 90-1, 90-2, or 90-3 is selected as the boot disk into memory and enables execution of the software. Since the boot file is replicated on all disks 90-1, 90-2, 90-3, any disk can be selected as the boot disk. In the subsequent explanation, disk 90-2 is presumed to be the boot disk.

As will be understood, it is necessary to boot the system when power is first switched on (Cold Boot initiated) or when necessary during system operation (Warm Boot initiated). For example, a manual 'Boot' button (not shown) is provided for initiating a Warm Boot.

For Cold Boot, the system processors 78, except for a maintenance panel 95, are in a reset state. On power up, maintenance panel 95 checks to determine if power input is correct, and if so, releases reset lines contained in a Boot Bus 92. Boot Bus 92 is coupled to Boot and LSIO service processor 73 and UI communication controller 80 on PWB 70-2 through boot bus processor 75, and to channel Loader/Scheduler processor 76 on PWB 70-10 through boot bus processor 77. The reset lines release processors 76 and 73 and UI communication controller 80, allowing Boot Bus 92 during the boot sequence to transmit software programs from PWB 70-2 to processor 76 on PWB 70-10 for downloading to each processor channel 81. Once communications are established, Boot Channel 93 initializes all channels 81 to enable downloading of the micro code instructions by channel Loader/Scheduler processor 76 as described in TABLE I.

Referring to FIG. 6, processor identification seals 160, which comprise, for example, a 12 byte quantity having a 6 byte time stamp 162 (read from the system real time clock 84 shown in FIG. 3B) and a 6 byte processor identifier (PROC ID) 164, are provided. The PROC ID 164 is kept in a memory chip such as PROM 69 socketed onto PWB 70-2 (seen in FIG. 3B) and remains with the machine in the event PWB 70-2 is replaced. A copy of the processor ID and initialized time stamp (SysNVM Seal) is stored in system NVM 63 on PWB 70-2 (seen in FIG. 3B). On each disk 90-1, 90-2, 90-3, the disk Physical Volume Root Page 85 (PV Root Page seen in FIGS. 4 and 14), which includes a PV Root Page seal and the position of the disk in the super disk setup, is stored at page zero.

With the identification seals described above, when one of the disks 90-1, 90-2, 90-3 or PWB 70-2 has been replaced, the change can be detected. Similarly, switching or swapping of the disks with one another can be detected.

Referring to FIGS. 5–14, whenever the system is booted, the NVM 63 and PWB 70-2 seals are verified by reading and comparing the PROC ID 164 stored in PROM 69 with the PROC ID from the SysNVM Seal. If not the same, PWB 70-2 is defective or replaced. Also an NVM retention check is run to see if NVM 63 held its data while power to the system was off and the data code for backup battery 71 checked to see if battery 71 is fresh. Further, to determine if PWB 70-2 is defective or replaced, the PROC ID is compared with the PVRoot Page PROC ID to see if the boot disk has been replaced and the SysNVM Seal is compared with the PVRoot Page Seals on the other disks to see any of the other disks have been replaced. A difference between the disk position in the PVRootPage and the current location of a disk indicates that two disks have been swapped, and are therefore not in correct position in the disk memory. The disk system file system, and application software are initialized to complete the booting process.

When the boot file 143 cannot be read off boot disk 90-2, the disk number is incremented by Scheduler/Processor 76 (seen in FIG. 3A) and the booting process started over using a second disk, i.e., either disk 90-1 or 90-3. If the second disk is found to be unavailable, booting from the third disk is tried. Where booting cannot be made from any disk following a preset number of tries, the system returns to a service dialogue routine in Diagnostic Manager 59 (seen in FIG. 2), requiring servicing by the Tech Rep and booting of the system from an outside source such as streaming tape.

Referring to Tables II–V, where it is determined that PWB 70-2 is defective and requires replacement, the defective PWB 70-2 is removed and a new PWB installed. PROM 69 on the defective PWB is removed and reinstalled on the new PWB to preserve identity between the new PWB and printing system 2.

Before PWB installation, the system is booted, flushing the contents of NVM 63 to disks 90-1, 90-2, 90-3. At this point, the new PWB with NVM is introduced. A special PWB installation control in which software determines the current state of the system (TABLE II) and based on that, performs specific initialization steps (TABLE V). For this, the software reads the PV Root Page Seals from each disk 90-1, 90-2, 90-3 and the SysNVM Seal from the new NVM and compares these with the PROC ID embedded in PROM 69. Depending on the result, a Message Number (TABLE II) is generated which, as shown in TABLE III, provides a Diagnostic Message with information for the Tech Rep. Additionally, a specific fault code (Fault Code) may be identified with further instructions to the Tech Rep (TABLE III).

Referring particularly to TABLE II, in the present instance, a new PWB has been installed (bd Repl=Y), the original PROM 69 re-installed (Prom Repl=N) and no disk has been replaced (Disks Repl=0). In this case, the PROC ID from PROM 69 does not match with the PROC ID read from the new NVM on the newly installed PWB (Pid≠NVM Pid). This identifies the System State as 4 and generates a Message Number of 1, the latter as seen from Table IV, confirming that a new PWB has been installed (PWB installation confirmed).

Based on the system state determination, the system initializing steps described in TABLE V are taken to initialize the system. In the example described, the System State was determined to be 4 which as seen in TABLE II, requires steps a, b, c, and d as the Initialize Action. As shown in TABLE V, the new PWB is initialized by setting up default hardware configuration values in the NVM (step a), setting the NVM initialized flag to TRUE (step b), generating the PROC ID Seal for the new NVM (step c), and copying the NVM seal to disks 90-1, 90-2, 90-3 (step d).

Following initialization, a normal disk boot is performed. If no disk is available, booting will be performed from an outside source as described.

The present invention protects the integrity of the combination of disk updates resident in NVM and the disk contents by preventing disk updates from occurring if the NVM or drives have been replaced. Additionally, the present invention provides confirmation to the Tech Rep that the elements maintained under the seal have been replaced.

While the invention has been described with reference to the structure disclosed, it is not confined to the details set forth, but is intended to cover such modifications or changes as may come within the scope of the following claims.

TABLE I

BOOT SEQUENCE CONTROL-NORMAL BOOT

1. Power and cable connections are checked both to scanner 4 and printer 8.

2. System memory 61 tested and initialized. Channel processors 81 perform reads and writes to various sections of memory 61.

3. Disk controller microcode is downloaded to disk controller processors 82 via boot bus 92 and boot download control logic 79.

4. If cold boot, spin-up commands sent to disk drives 83 (if warm boot, checks made to see if all disks 90-1, 90-2, 90-3 are spinning).

5. Channel loader microcode is sent via boot bus 92 to PWB 70-10. Microcode is then downloaded using boot download control logic 79 to channel loader/scheduler processor 76.

6. Channel loader/scheduler processor 76 requests that disk controller processor 82 retrieve the controller microcode file from disk 90-2. Disk controller processor 82 ships file to memory 61. Channel loader/scheduler processor 76 then downloads microcode to each channel 81 using boot download control logic.

7. Channel loader/scheduler processor 76 requests that disk controller processor 83 retrieve the application software loader program from disk 90-2. Disk controller processor 83 ships file to memory 61.

8. Scheduler microcode is downloaded into channel loader/scheduler processor 76. Processor 76 will now perform only as a scheduler processor.

9. Application software loader program is started. Application software is retrieved from disk 90-2 and stored in memory 61.

10. UI 52, scanner 4, and printer 8 software is downloaded.

TABLE II

| System State | Prom Repl | Bd Repl | Disks Repl | Message Number | Fault Code | Initialize Action | Means of Identifying Items Replaced |
|---|---|---|---|---|---|---|---|
| 0 | N | N | 0 | 2 | | a,b,c,d | Pid = NvmPid, NvmSeal = [all] DiskSeals |
| 1 | x | x | x | 4 | FC01 | No Op | Pid has bad checksum or checksum compliment |
| 2 | N | N | 1 or 2 | 3 | FC02 | a,b,c,d | Pid = NvmPid, NvmSeal = [1 or 2] DiskSeals |
| 3 | N | N | 3 | 3 | FC03 | a,b,c,d | Pid = NvmPid, NvmSeal = [no] DiskSeals [all] DiskSeals are consistent with each other |
| 4 | N | Y | 0 | 1 | | a,b,c,d | Pid $\neq$ NvmPid, Pid = [all] DiskPids, NvmSeal = [no] DiskSeals, [all] DiskSeals are consistent with each other |
| 5 | N | Y | 1 or 2 | 1 | | a,b,c,d | Pid $\neq$ NvmPid, Pid = [1 or 2] DiskPids, NvmSeal = [no] DiskSeals |
| 6 | N | Y | 3 | 3 | FC04 | a,b,c | Pid $\neq$ NvmPid, NvmSeal = [no] DiskSeals |
| 7 | Y | N | 0 | 1 | | c,d | Pid $\neq$ NvmPid, NvmSeal = [all] DiskSeals |
| 8 | Y | N | 1 or 2 | 1 | | c,d | Pid $\neq$ NvmPid, NvmSeal = [1 or 2] DiskSeals |
| 9 | Y | N | 3 | 3 | FC04 | a,b,c | Pid $\neq$ NvmPid, NvmSeal = [no] DiskSeals |
| 10 | Y | Y | 0 | 3 | FC05 | a,b,c,d | Pid $\neq$ NvmPid, NvmSeal = [no] DiskSeals [all] DiskSeals are consistent |
| 11 | Y | Y | 1 or 2 | 3 | FC04 | a,b,c | Pid $\neq$ NvmPid, NvmSeal = [no] DiskSeals |
| 12 | Y | Y | 3 | 3 | FC04 | a,b,c | Pid $\neq$ NvmPid, NvmSeal = [no] DiskSeals |
| 13 | Y | Y | 0 | 3 | FC03 | a,b,c,d | Pid = NvmPid, NvmSeal = [no] DiskSeals [all] DiskSeals are consistent with each other |
| 14 | N | N | 3 | 3 | FC04 | a,b,c | Pid = NvmPid, NvmSeal = [no] DiskSeals [1 or 2] DiskSeals are inconsistent |

Note:
1. If a disk seal cannot be read, it is considered not to match any other seal, and the disk is treated as if it had been replaced.
2. If all disks have been replaced, then the system will not be able to disk boot. The Service Rep must Stream Tape Boot.
3. Cases 6,9,11, and 12 are indistinguishable to the software, so it is Unknown what the Service Rep did.
4. Cases 3 and 13 are indistinguishable to the software, so it is Unknown what the Service Rep did.

TABLE III

| Fault Code | Instruction to Service Rep |
|---|---|
| FC01 | 1. Check to see that Proc Id PROM is correctly installed on bd.<br>2. Replace board 70-2.<br>3. Replace Proc Id PROM 69. |
| FC02 | It is not necessary to Install the pwb 70-2 if only disks have been replaced. |
| FC03 | If the pwb 70-2 was replaced, be certain that the machine's original Proc Id PROM was inserted in the new board. |
| FC04 | After finishing board installation, Stream Tape Boot is mandatory. |
| FC05 | Be certain that the machine's original Proc Id PROM was inserted in the new board 70-2. |

TABLE IV

| Diagnostic Message | Message Number |
|---|---|
| PWB 70-2 installation confirmed. Press Yes to continue. | 1 |
| New PWB not detected. Press Yes to continue. | 2 |
| PWB and/or disk replacement detected -- see Fault Code for additional activities required. | 3 |
| Failure detected during installation -- see Fault Code. | 4 |

TABLE V

Initialize Action, Performed by PLM a  Set up default hardware configuration values in PLM NVM.
b  Set NVM initialized flag to TRUE.
c  Generate Seal, copy it to NVM, read back and verify.
d  Copy NVM seal to UNREPLACED disks, read back and verify.

What is claimed is:

1. In an electronic printing system having system memory including plural hard disks providing permanent file storage and non-volatile memory for storing data temporarily, wherein, at preselected intervals, the temporarily stored data is transferred from the non-volatile memory to a selected one of said hard disks, and a printed wiring board, installed in one of a plurality of processors, said printed wiring board having a memory chip thereon and supporting at least a portion of said non-volatile memory, a process for preserving the integrity of system memory in the event said non-volatile memory is replaced, comprising the steps of:
   a) programming said memory chip with a permanent processor identifier for said system;
   b) generating a time stamp identifying the date said printed wiring board was installed in said system;
   c) combining said permanent processor identifier from said memory chip with said time stamp to provide an identifier seal to identify said printed wiring board installation date and the processor with which said non-volatile memory was installed;
   d) storing copies of said identifier seal to each of said hard disks;
   e) comparing the permanent processor identifier from said memory chip with the processor identifiers of said respective identifier seals whenever said system is booted to an operating state to determine if said printed wiring board with said non-volatile memory has been replaced; and
   f) faulting said system to inhibit transfer of the temporarily stored data from said non-volatile memory to the selected one of said hard disks when the permanent processor identifier from said memory chip is different from said processor identifier of said selected hard disk identifier seal, and maintaining a faulted condition until said permanent processor identifier from said memory chip matches said processor identifier of said selected hard disk identifier seal.

2. The process according to claim 1 including the steps of:
   on booting of said system, checking said non-volatile memory to see if said non-volatile memory retained data while power to said system is interrupted; where data in said non-volatile memory is lost notifying an operator to replace said. printed wiring board;

3. The process according to claim 2 including the steps of:
   a) reading the processor identifier from said replaced non-volatile memory;
   b) reading the processor identifier from said transferred memory chip;
   c) comparing said processor identifier from said replaced non-volatile memory with said processor identifier from said memory chip; and
   d) where said processor identifier from said replaced non-volatile memory is different than the processor identifier from said memory chip,
      1) combining said processor identifier from said memory chip with the time stamp for said replaced printed wiring board to provide an updated processor identifier seal,
      2) storing said updated processor identifier seal in said replaced non-volatile memory, and
      3) storing said updated processor identifier seal to said disks.

4. The process according to claim 1 in which said printed wiring board includes an alternate power source to maintain said non-volatile memory in the event power to said non-volatile memory is interrupted and said permanent file storage includes a date code for said alternate power source, including the steps of:
   on booting said system, accessing said date code;
   comparing said date code with the time at which said booting takes place to determine if said alternate power source is fresh;
   where the interval between said date code and said booting time exceeds a predetermined duration, notifying an operator to replace said printed wiring board.

5. The process according to claim 4 including the steps of:
   a) reading the processor identifier from said replaced non-volatile memory;
   b) reading the processor identifier from said transferred memory chip;
   c) comparing said processor identifier from said replaced non-volatile memory with said processor identifier from said memory chip; and
   d) where said processor identifier from said replaced non-volatile memory is different than the processor identifier from said memory chip,
      1) combining said processor identifier from said memory chip with the time stamp for said replaced printed wiring board to provide an updated processor identifier seal,
      2) storing said updated processor identifier seal in said replaced non-volatile memory; and
      3) storing said updated processor identifier seal to said disks.

6. A method for preserving the integrity of the memory in an electronic printer in the event a part of said memory is replaced, said memory including plural disks providing permanent data storage, random access memory for temporary data storage, and non-volatile memory for storing data temporarily, wherein, at preselected intervals, the temporarily stored data is transferred from the non-volatile memory to a selected one of said hard disks, said memory part comprising said non-volatile memory on one of a plurality of processors, each of said processors supporting a printed wiring board, comprising the steps of:
a) providing a processor identifier with said printed wiring board that identifies the particular one of said processors in which said printed wiring board is installed;
b) generating a time stamp identifying the date of installation of said printed wiring board in said processor;
c) combining said processor identifier on said printed wiring board with said time stamp to provide an identifier seal to identify the installation data of said printed wiring board and the processor with which said non-volatile memory is associated;
d) storing copies of said identifier seal to each of said disks;
e) comparing the permanent processor identifier of said printed wiring board with the processor identifier in said identifier seal in response to booting said processor to determine if said printed wiring board with said non-volatile memory has been replaced; and
f) faulting said system to inhibit transfer of the temporarily stored data from said non-volatile memory to the selected one of said hard disks if said printed wiring board has been replaced and said permanent processor identifier is different from said processor identifier of said selected hard disk identifier seal, and maintaining a faulted condition until said permanent processor identifier from said printed wiring board matches said processor identifier of said selected hard disk identifier seal.

7. The method according to claim 6 including the steps of:
on booting said processor, checking said non-volatile memory to see if said non-volatile memory retained data while power to said system is interrupted;
where data in said non-volatile memory is lost, notifying an operator to replace said printed wiring board with a second printed wiring board having a new non-volatile memory with a processor identifier.

8. The method according to claim 7 including the steps of:
a) accessing the processor identifier in said new non-volatile memory
b) accessing the processor identifier on said second printed wiring board;
c) comparing the processor identifier in said new non-volatile memory with the processor identifier on said second printed wiring board; and
d) where said processor identifier in said new non-volatile memory is different than the processor identifier on said second printed wiring board,
   1) combining said processor identifier on said second printed wiring board with the time stamp for the date on which said second printed wiring board was installed to provide an updated processor identifier seal,
   2) storing said updated processor identifier seal in said new non-volatile memory, and
   3) storing said updated seal to said disks.

9. The process according to claim 6 in which said printed wiring board includes alternate power means to maintain said non-volatile memory in the event power to said non-volatile memory is interrupted, said permanent data storage including an alternate power means date code, including the steps of:
on booting said system, comparing said alternate power means date code with the time at which said booting takes place to determine the operating state of alternate power means;
where the interval between said alternate power means data code and said booting time exceeds a predetermined duration, notifying an operator to replace said printed wiring board.

10. The process according to claim 9, in which a memory chip with a processor identifier is provided, including the steps of:
a) reading the processor identifier from said replacement non-volatile memory;
b) reading the processor identifier from said memory chip;
c) comparing said processor identifier from said replacement non-volatile memory with said processor identifier from said memory chip; and
d) where said processor identifier from said replacement non-volatile memory is different than the processor identifier from said memory chip,
   1) combining said processor identifier from said memory chip with the time stamp for said replacement printed wiring board to provide an updated processor identifier seal, and
   2) storing said updated processor identifier seal in said replacement non-volatile memory.

* * * * *